United States Patent [19]

Shalaby et al.

[11] Patent Number: 5,780,580
[45] Date of Patent: Jul. 14, 1998

[54] FUNCTIONALIZED CRYSTALLINE POLYACTONES AS TOUGHNERS FOR THERMOSETTING RESINS

[75] Inventors: Shalaby W. Shalaby, Anderson, S.C.; Lance A. Monroe, Boynton Beach, Fla.

[73] Assignee: Clemson University, Clemson, S.C.

[21] Appl. No.: 911,450

[22] Filed: Aug. 15, 1997

Related U.S. Application Data

[62] Division of Ser. No. 567,843, Dec. 6, 1995, Pat. No. 5,691,444.
[51] Int. Cl.$^6$ .................................................. C08G 63/08
[52] U.S. Cl. .................... 528/354; 528/355; 528/361; 528/366; 528/403; 528/409; 528/183
[58] Field of Search ......................... 528/354, 355, 528/361, 366, 403, 469, 183

[56] References Cited

U.S. PATENT DOCUMENTS

| | | | |
|---|---|---|---|
| 4,683,287 | 7/1987 | Koleske et al. | 528/357 |
| 5,212,261 | 5/1993 | Stiermon | 525/506 |
| 5,405,686 | 4/1995 | Portelli et al. | 428/229 |
| 5,462,996 | 10/1995 | Portelli et al. | 525/423 |

OTHER PUBLICATIONS

"Photosynthesis and Application of Polyfunctional . . . ", J. Applied Pol. Sci., vol. 44, 789–797 (1992).
"Influence of Chain Flexibility and Crosslink Density on Mechanical Properties of Epoxy/Amine Networks", Polymer Engineering & Science, vol. 31, No. 221572–1580 (Nov. 1991).
"Principles of Polymer Processing", Tadmor & Gogus, John Wiley & Sons, New York (1979).
"Plasticizers", Search & Touchette, pp. 569.
"Plascitizer Theory", The Technology of Plasticizers, J. Kem Search & Joseph R. Darby, John Wiley & Sons, New York, (1982).
"Rubber–Toughened Plastics", Polymer Blends & Composites, Manson & Sperling, 77–105, Plenum Press, New York (1977).
"Crosslink Density and Fracture Toughness of Epoxy Resins", J. of Material Sci., vol. 26, 2348–2352 (1991).
"Mechanisms of Energy Dissipation in Elastomer–Moeified Thermosetting Polymer Matrices and Composites Based on Such Polymers", Polymer Science, vol. 34, No. 11, pp. 919 (1992).
"Blends Containing Poly(—caprolactone) and Related Polymers", J.V. Koleske, Polymer Blends, vol. 2, 369–389.
"Principles of Plasticization", Plasticization & Plasticizer Process, American Chem. Society, Washington, DC (1965), pp. 1–27.
"Polymeric Plasticizers", Plasticization & Plasticizers Processes, Heinrich Hopff, American Chem. Society, Washington, DC (1965) 87–94.
"Toughening of Epoxy Resin Networks with Functionalized Engineering Thermoplastics", Hedrick et al, Toughened Plastics I–Science & Engineering, American Chem. Society, Wash., DC (1993(.
"The Synergistic Effect of Cross–Link Density and Rubber Additions on the Fracture Toughness of . . . ", Toughened Plastics I—Science & Engineering, Riewet al, Am. Chem. Soc., Wash., DC (1993) 317–334.
"Plasticizer Blending/Copolymerization Impact Testing", Mechanical Properties of Polymers, N. M. Bikales, Wiley Interscience, New York (1971).
"An Introduction to Performance Polymers", Baer & Moet, 17–29.
"High Performance Polymers", An Introduction to Performance Polymers, Baer & Moet, New York (1991).
"Toughening of Epoxy Resins by Modification with Reactive Elastomers Composed of Butyl Acrylate and Glycidyl (Meth)Acrylate", European Polymer J., vol. 27, No. 9, pp. 851–858 (1991).
"The Elastic Range of Polymers and Its Change by Plasticization", Plasticization & Plasticizer Processes, Am. Chem. Society, Washington, DC (1965).

*Primary Examiner*—Duc Truong
*Attorney, Agent, or Firm*—Leigh P. Gregory

[57] ABSTRACT

A crystalline polylactone is produced having reactive acrylate end groups. When incorporated into a thermosetting resin which includes reactive C=$CH_2$ sites, the present functionalized polylactone acts as a toughener, greatly increasing the impact resistance of the final cured product. Also disclosed are carboxyl-bearing polylactones as tougheners for epoxy resin systems.

8 Claims, No Drawings

FUNCTIONALIZED CRYSTALLINE POLYACTONES AS TOUGHNERS FOR THERMOSETTING RESINS

This is Divisional Application of application Ser. No. 567,843, filed Dec. 6, 1995, now U.S. Pat. No. 5,691,444.

BACKGROUND OF THE INVENTION

Crosslinked polymer networks in the form of high Tg (glass transition temperature) thermosets, with or without reinforcement using high modulus fillers, are a major source of structural materials. Toughness, which is the resistance of materials to undergo crack propagation, is an important property of structural materials intended for load-bearing applications as in manufacturing air-craft components or orthopedic devices.

Brittle thermosets are often used as the matrix in structural composite materials for their high stiffness, high strength, and excellent dimensional stability. However, their low toughness can detract from their usage. Toward increasing toughness of brittle thermosets several investigators have used a dispersion of a particulate second phase which is typically made of rubber particles. However, incorporating the high compliance, low strength rubber phase into the matrix lowers other key desirable properties such as high strength and stiffness.

To avoid such a change, rigid ceramic and other inorganic particles such as alumina and silica or rigid thermoplastic polymers, including aromatic polyethers and polysulfones have been used with limited success as the second phase. This evoked a critical review of commonly used approaches and mechanisms for toughening thermosets to identify the morphological and molecular features that can be sought in an effective toughener for typical thermosets, such as acrylic and epoxy resins.

Dispersing small amounts of elastomers, which are preferably reactive in the matrix, is a most successful and commonly used method for toughening polymeric materials. Parameters such as particle size and concentration of the elastomers, interfacial miscibility of the toughener and matrix prior to and upon curing of the latter, are considered most critical.

Recently, appreciation of thermoplastic polymers as tougheners was evidenced in studies of the effective toughening of epoxy using (a) polyphenylene oxide; (b) functionalized poly(arylene ether ketone); and (c) functionalized polysulfones.

Furthermore, it has been found that crystalline polymers may be used in a rigid matrix in place of rubber tougheners for load-bearing materials with mostly uncompromised stiffness. Crystalline polymers which undergo stress-induced phase transformation lead to positive volume change and subsequent increase in fracture energy. The role of stress-induced transformation in crystalline polymers has been described as being analogous to that of zirconia when used for ceramic toughening.

In ceramic toughening, the metastable tetragonal phase zirconia undergoes stress-induced phase transformation at room temperature to the monoclinic phase leading to positive volume change in the vicinity of the crack tip. The dilatational and deviatoric components of the transformation plasticity at the crack tip increase the critical fracture energy. Accordingly, polymers such as poly(butylene terephthalate) (PBT), nylon 6, and poly(vinylidene fluoride) have been used as tougheners because of their great ductility, toughness, and propensity to undergo stress-induced phase transformation. These polymers were shown to increase the toughness of the non-toughenable epoxy considerably. PBT was found to be most effective. The causes for toughness enhancement in these systems were concluded to be (a) crack path alteration, (b) primary and secondary crack bridging, and (c) ductile fracture of the thermoplastic polymer. The maximum toughness increase due to PBT was suggested to be due to its phase transformation ahead of the crack tip.

U.S. Pat. No. 4,683,287 is directed to a reactive monomer which is the reaction product of a lactone with a hydroxyalkyl acrylate or methacrylate. Such reaction is performed in an oxygen-rich atmosphere and yields a low molecular weight product of the general formula

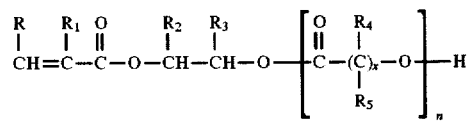

wherein R, $R_1$, $R_2$, and $R_3$ are independently hydrogen or methyl, $R_4$ and $R_5$ are independently hydrogen or alkyl of from 1 to 12 carbon atoms, x is from 4 to 7, and the average value of n in the composition is 1 to 3. The reactive monomer may be copolymerized with comonomers such as acrylic, vinyl or similar monomers to yield oligomers and/or copolymers which when cross-linked yield coatings or adhesives, having high flexibility, impact resistance, solvent resistance, hydrolytic stability, and chemical compatibility.

In the prior art, monomers, oligomers and/or polymers which can introduce an internal plasticizer to the macromolecular chain have been considered to be most pertinent to achieving the sought properties without encountering the surface migration problem normally observed with external plasticizers. However, all reactive agents of the prior art which are directed to internal plasticization of thermosetting resins result in substantial decreases in stiffness. Thus, for achieving high toughness with minimum decrease in stiffness in load-bearing thermosets, new types of reactive agents are needed.

Accordingly, this invention relates to the use of specially designed, reactive agents for toughening thermosets with a minimum decrease in stiffness. The resulting toughened thermosets may be beneficially employed in a variety of end uses. Biomedical applications which would benefit from the provision of a toughened thermoset polymer matrix include toughened bone cement and stereolithographically produced medical device prototypes.

Specifically, the need to develop toughened articles using the stereolithographic technique and the great potential of this process in itself is well known in the art. Rapid production of 3-dimensional prototypes can be achieved using a Stereolithography Apparatus (SLA), which is in effect a miniature manufacturing unit for rapid prototyping that can build complex parts in situ by building thin cross-sections of a photopolymer on top of each other to form a part. The part is built according to a Computed Aided Drawing (CAD) model, and the SLA software slices the part into cross sections. A focused ultraviolet (UV) light laser beam causes the cure of a photopolymerizable acrylic oligomer into a highly crosslinked polymer to build the cross sections of the part. The movements of the laser are controlled by a computer that is connected to the SLA. The time to build a part may take minutes up to hours, depending on the thickness of each cross-sectional layer.

The SLA dramatically reduces the time from product conceptualization to producing a prototype. However, the parts fabricated in the SLA have a high crosslink density and are, therefore, typically brittle. Subsequently, the resulting parts usually display poor mechanical properties. Therefore, the SLA parts can only serve as a nonfunctional representation of the final article sought in the development of an actual product. Thus, there exists a clear need for a novel resin composition for the SLA application.

There also exists a need for toughened epoxy resin compositions for use in structural applications such as, for example, aircrafts, load bearing panels and a variety of reinforced structural materials.

SUMMARY OF THE INVENTION

Accordingly, one object of the present invention is to provide a reactive composition which can be used as an effective toughener of high-modulus thermosets.

A further object of the present invention as to provide a thermosetting system which may be employed in stereolithography to produce a toughened, useful part.

Yet another object of the present invention is to provide a composition for use in toughening acrylic thermosets.

A still further object of the present invention is to provide a toughener for vinyl and/or unsaturated polyester-based thermosets.

Another object of the present invention is to provide a composition for use in toughening epoxy thermosets.

These as well as other objects are achieved by providing a toughener for use with a thermosetting resin capable of undergoing addition polymerization comprising a crystalline polylactone having a functional acrylate end group, said functionalized polylactone having an average molecular weight of at least about 1000.

Such objects are further achieved by providing an internal plasticizer for use in a thermosetting resin, wherein the thermosetting resin includes reactive C=CH$_2$ groups, the plasticizer comprising a reactive polymer of the formula:

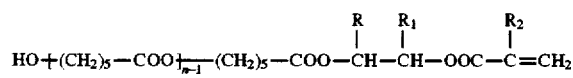

wherein R is hydrogen or methyl, R$_1$ is hydrogen or methyl, R$_2$ is hydrogen, methyl, ethyl, propyl or butyl and the average value of n is at least 5.

The above objects are still further achieved by providing the reaction product of
(a) caprolactone; and
(b) an acrylate of the formula:

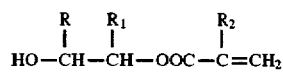

wherein R is hydrogen or methyl, R$_1$ is hydrogen or methyl, and
R$_2$ is hydrogen, methyl, ethyl, propyl or butyl;
wherein the reactants are present in a molar ratio of at least 10 moles of caprolactone per mole of acrylate.

Such objects are also achieved by providing a toughener for use with a thermosetting resin capable of undergoing ring opening polymerization, comprising a crystalline polylactone having one or more carboxylic groups per chain, said functionalized polylactone having an average molecular weight of at least about 1000.

The above objects are further achieved by providing an internal plasticizer for use in a thermosetting resin composition, wherein said thermosetting resin includes reactive carboxylic groups, said plasticizer comprising a reactive polymer of the formula:

where R and R$_1$ are independently hydrogen, methyl, or —CHR$_2$—COOH, and R$_2$ is hydrogen, methyl, or —CH$_2$—COOH and n is at least 5.

DETAILED DESCRIPTION OF THE INVENTION

The present invention deals with synthesis of crystalline polylactones (PcL) with one alkacrylate end-group (PcL-Acr) or PcL with one or more reactive carboxylic groups (PcL-COOH) and their reaction with the precursors of crosslinked acrylic and epoxy resins, respectively, to produce toughened thermosets characterized by high Tg, stiffness (or modulus), and impact strength.

To produce acrylate-bearing PcL, a lactone such as ε-caprolactone is polymerized in the presence of an organometallic catalyst such as stannous octoate and a small amount of a hydroxyalkyl acrylate (methacrylate or ethylacrylate) monomer as an initiator, and a free radical inhibitor to prevent free radical polymerization of the acrylic end-group. A preferred initiator for the formation of PcL-Acr is 2-hydroxy-ethyl methacrylate (HEMA). For reacting HEMA with a lactone, such as ε-capro-lactone, to produce a crystalline toughening agent with a preferred degree of polymerization higher than 5, polymerization was conducted under anhydrous conditions, thereby avoiding the formation of non-reactive, saturated oligomer formed through water-initiated, ring opening polymerization. Furthermore, ring opening polymerization was conducted in an inert atmosphere, rather than allowing the polymerization to take place in an oxidizing, oxygen environment. Distilled monomer was employed and volatile components were removed from the solid polymer to eliminate liquid reactive or non-reactive oligomers which can cause an excessive decrease in the modulus of the cured thermoset or interlinking with the matrix, respectively.

The resultant reactive polymer of the present invention may be employed as an internal plasticizer/toughener for acrylic resins, as well as vinyl or unsaturated polyester resins. More generally, the present reactive polymer may be employed as a toughener for thermosetting resins which include a reactive C=CH$_2$ site such as acrylics, vinyls and styrenic resin systems. That is, the present reactive polymer may be employed as a toughener for resin systems which are capable of undergoing addition polymerization with the reactive acrylate end-group.

Also in accordance with the present invention, carboxyl-bearing PcL may be used as a toughener for thermosetting epoxy resin systems. Such carboxyl-bearing PcL is formed when a lactone such as epsilon-caprolactone is polymerized in the presence of an organometallic catalyst and a small amount of organic hydroxy acid or hydroxypolycarboxylic acid, such as glycolic and malic acid, respectively, as initiator and molecular weight control agent. The carboxylic group (or groups) allows for the development of a covalent interface between the matrix and toughener through acylation of the epoxy group. Having more than one carboxylic group per PcL chain can be used to increase interfacial adhesive strength. The amount of initiator is adjusted so as to produce crystalline reactive PcL-COOH which (a) is miscible in the epoxy precursors; (b) forms microdispersed crystalline second phase as the epoxy cures; (c) results in a ductile thermoplastic toughener that is covalently linked to the brittle matrix and supports crack path alteration as well as primary and secondary crack bridging; and (d) may undergo stress-induced phase transformation leading to positive volume change in the vicinity of the crack tip and, hence, an increase in the critical fracture energy and impact strength without a significant decrease in stiffness.

Using ε-caprolactone as a model lactone, the formation reaction of functionalized polymers and reaction with pertinent matrices are illustrated below.

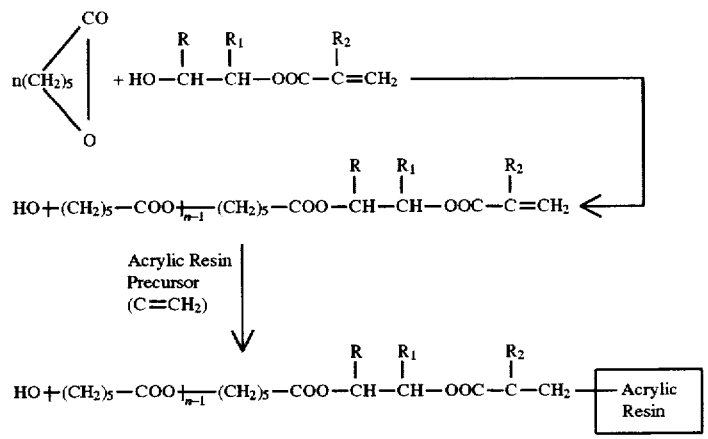

wherein R is hydrogen or methyl, $R_1$ is hydrogen or methyl, and $R_2$ is hydrogen, methyl or ethyl.

Although epsilon-caprolactone is preferred for use in the present invention, 4-oxacaprolactone, a caprolactone having an oxygen substituted for one of the five methylenes as such:

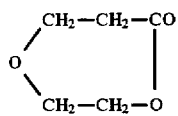

may also be employed. Preferably, up to 25 percent by weight of 4-oxacaprolactone may be blended with epsilon-caprolactone for use in the present inventive reaction. Also within the scope of the present invention are substituted lactones such as poly-1-lactide.

For use in toughening epoxy resins, caprolactone may be generally functionalized as follows:

$$n(CH_2)_5 \begin{matrix} CO \\ | \\ O \end{matrix} + HO-CH-COOH \\ | \\ CH_2COOH$$

$$HO+(CH_2)_5-COO\underset{n-1}{\longrightarrow}(CH_2)_5-COO-CH-CHCOOH \\ | \\ COOH$$

Epoxy Resin Precursor ↓

$$HO+(CH_2)_5-COO\underset{n-1}{\longrightarrow}(CH_2)_5-COO-CH-CHCOO\boxed{\text{Epoxy}} \\ | \\ COO\boxed{\text{Resin}}$$

Hereagain, 4-oxacaprolactone may be employed in a blend with epsilon-caprolactone.

As noted above, biomedical applications of compositions subject of this invention include using the PCL-Acr to produce toughened bone cement by incorporating it with the poly(methyl methacrylate) powder component used for preparing the cured bone precursors; and incorporating the PCL-Acr in the thermoset precursors used in stereolithographic production of prototypes of medical devices, as well as many other prototypes of great industrial significance.

EXAMPLE 1

Preparation of Moderate Molecular Weight Acrylate-terminate Poly(ε-Caprolactone)PCL-Acr A mixture of freshly distilled ε-caprolactone (CL) (228.8 g, 2.045 mole), 2-hydroxyethyl methacrylate (HEMA)

(1337.6 mg; 10.09 mole), and the free radical polymerization inhibitor, hydroquinone monoethyl ether (HQME) (28 mg. 0.2188 m mole) and stannous octoate (SO) (269.9 mg; 0.6664 mole) as 0.33M solution in toluene were mixed in a flame-dried stirred reactor under a dry nitrogen atmosphere. The reaction mixture was heated to 140° C. and kept at this temperature for 6 hours. At the end of this period, the temperature was lowered to 100° C. and traces of unreacted monomer were distilled under reduced pressure before cooling to room temperature. The solid polymer was then isolated and stored at 10° C. To isolate samples for polymer characterization, testing, and use as toughener, the cold polymer was allowed to reach room temperature in a nitrogen atmosphere.

EXAMPLE 2

Preparation of High Molecular Weight Acrylate-Terminated Poly(ε-Caprolactone PCL-Acr Following the same procedure used in Example 1, the following polymerization charge was used to obtain high molecular weight polymer:

CL 227.98 g (1.997 mole)
HEMA 655.3 mg (5.04 mole)
HQME 27.5 mg (0.2214 mole)
SO 309.4 mg (0.7638 mole)

EXAMPLE 3

Verification of the Polymerizability of the Reactive PCL of Example 1

Azobisisobutryronitrile (AIBN) was used as a free radical polymerization initiator to verify that the synthesized reactive PCL of Example 1 contained reactive end groups ($C=CH_2$). A mixture of AIBN (1.5% by weight) and the reactive PCL were heated in a mechanically stirred reactor at 80° C. for 3 hours under a nitrogen atmosphere. The reaction was concluded after a change in viscosity was observed, due to polymerization of the reactive PCL end groups. Then, the polymer was cooled to room temperature and stored at −10° C.

EXAMPLE 4

Verification of the Polymerizability of the Reactive PCL of Example 2

Employing the procedure set forth in Example 3 above, azobisisobutryronitrile (AIBN) was used as a free radical polymerization initiator to verify that the synthesized reactive PCL of Example 2 contained reactive end groups ($C=CH_2$).

EXAMPLE 5

Characterization of Acrylate-Terminated PCL

To characterize the resulting polymers from Examples 1–4, Differential Scanning Calorimetry (DSC), solution viscosity, gel permeation chromatography (GPC), and Fourier Transform Infrared Spectrometry (FTIR) were used.

A DuPont 2000 DSC was used to record the thermal characteristics of the reactive PCL before and after reaction with the AIBN for both low and high molecular weight polymers. Each sample was initially heated at a rate of 10° C./minute to 80° C., in a nitrogen environment and then quenched with liquid nitrogen. The samples were reheated at the same rate, and the glass transition temperature (Tg), recrystallization temperature (Tc), and melting temperature (Tm) were recorded.

The relative and inherent viscosities (ηrel and ηinh) of the reactive PCL before and after reaction with the AIBN were determined using a KIMAX® Cannon-Fenske 50 capillary viscometer. Chloroform was used as the solvent to produce 0.1% solutions. The procedure was carried out in a water bath with a constant temperature of 33° C.

The molecular weight distributions of the reactive PCL before and after reaction with the AIBN were determined by using a Waters 486 GPC with a Waters 401 RI detector and a Styragel™ HT Linear 10 µm column. From the GPC analysis, the number average molecular weight ($\overline{M}n$) and weight average molecular weight ($\overline{M}w$) of the polymers were ascertained.

A Digilab BioRad FTS-45 FTIR was used to examine the acrylate groups in the reactive PCL before and after reaction with the AIBN. A 1 mm film, cast from methylene chloride on IRTRAN® plates, was made. Then, under a nitrogen purge, the IR spectra of the film was recorded using 64 scans, ranging from 4000–700 $cm^{-1}$ wavelengths, with a resolution of 2 $cm^{-1}$. After known regions of absorbance were ascertained, the groups of interest were identified.

Table I contains a summary of the transition temperatures for the reactive PCL before and after reaction with the AIBN for both molecular weights. The $T_g$ and $T_m$ for the low molecular weight reactive PCL and PCL after reaction with the AIBN are both approximately −70° C. and 50° C., respectively. The $T_g$ of the high molecular weight reactive PCL and PCL after reaction with the AIBN is −75° C. and −82° C., respectively, and the $T_m$'s for both are approximately 46° C.

TABLE I

DSC Data of Reactive PCL

| | $T_g$(°C.) | $T_c$(°C.) | $T_m$(°C.) |
|---|---|---|---|
| Low Molecular Weight PCL | | | |
| Ex. 1 (before AIBN reaction) | −73 | −60 | 50 |
| Ex. 3 (after AIBN reaction) | −70 | −58 | 50 |
| High Molecular Weight PCL | | | |
| Ex. 2 (before AIBN reaction) | −75 | −62 | 47 |
| Ex. 4 (after AIBN reaction) | −82 | −61 | 46 |

Solution viscosity measurements and GPC results are contained in Table II. For the low molecular weight reactive PCL, the inherent viscosity increased from 0.46 dL/g to 0.86 dL/g, upon polymerization in presence of AIBN. For the high molecular weight PCL, the inherent viscosity increased from 0.80 dL/g to 1.02 dL/g, when the initial reactive PCL was compared to the reactive PCL after polymerization with the AIBN. The results of the inherent viscosity measurement show a statistically significant increase for the high and low molecular weight samples of reactive PCL when treated with AIBN compared to the reactive PCL before such treatment. This indicated an increase in molecular weight due to the polymerization of the acrylate end groups. This was further verified by GPC, thus ascertaining the presence of acrylic end groups on the PCL made to be reactive.

TABLE II

Solution Viscosity and GPC Data of Reactive PCL

| | η inh (dL/g) | M̄n Daltons | M̄w Daltons |
|---|---|---|---|
| Low Molecular Weight PCL | | | |
| Ex. 1 (before AIBN reaction) | 0.46 | 14,747 | 48,464 |
| Ex. 3 (after AIBN reaction) | 0.86 | 28,781 | 291,328 |
| High Molecular Weight PCL | | | |
| Ex. 2 (before AIBN reaction) | 0.80 | 17,870 | 90,370 |
| Ex. 4 (after AIBN reaction) | 1.02 | 28,398 | 111,722 |

EXAMPLE 6

Preparation of Toughened SLA Resin

Since a commercial SLA is not designed to handle small resin quantities, an automated desktop photolithography unit (ADPU) was used. The ADPU uses a mercury lamp for the UV light source. The mercury lamp is mounted on a bench, that can move in the X and Y directions. To fabricate the samples, the velocity of the bench was set at 0.25 cm/sec. Initially, the sample platform was immersed into the resin pool. Then, the resin was cured according to coordinates contained in a C-language computer program. To make another layer, the sample platform was immersed into the resin pool, the X-Y positioner was reset to the original starting position, and the program was executed again. All the ADPU samples were composed of three layers.

Control group samples were made of Somos™ 3100, an acrylate, diacrylate, triacrylate resin including a photoinitiator and stabilizer, supplied by duPont. The second group of samples consisted of a blend comprised of the Somos™ 3100 resin and 20% of the low molecular weight toughener of Example 1 and the third group of samples consisted of a blend comprised of the Somos™ 3100 resin and the high molecular weight toughener of Example 2. The resin pools were heated to 60° C. and maintained at that temperature until sample fabrication was complete.

After sample fabrication, all samples were post-cured in a post-curing apparatus (PCA) made by 3D Systems (Valencia, Calif.). The PCA is the recommended method for post-curing SLA parts after fabrication in a SLA. The samples were cured for a total of 50 minutes (25 minutes per side).

The final dimensions of the test specimens were 2 in.×2 in.×0.06 in. (l×w×h). Prior to testing, the average thickness of the specimens was determined by recording 8 thickness measurements from each sample (2 measurements per side). Then, the samples were stored in a dark container, at room temperature, until testing took place.

EXAMPLE 7

Testing of Toughened SLA Resins

A General Research Corporation Dynatup Impact Tester was used to assess the impact toughness of each specimen to a direct blow from a falling object. The striker assembly slides freely on vertical guides and is released from a predetermined height to strike a specimen supported on the base of the instrument. Photoelectric sensors are placed near the end of the fall to determine velocity of the weight. The absorbed energy and the force are calculated from the change in velocity caused by impact with the specimen. The results of the impact testing are contained in Table III. The low molecular weight reactive PCL of Example 1 resulted in an increase in impact toughness from 29.66 to 130.80 J/m, when compared to the control samples made of pure resin. This increase in impact toughness resulted in a 340.97% increase when compared to the control. The high molecular weight reactive PCL of Example 2 caused an increase in the impact toughness of the resin from 29.66 J/m to 339.04 J/m, when compared to the samples made of pure resin. This increase in impact toughness resulted in a 1043.05% increase in impact toughness.

TABLE III

Impact Toughness Data of the DuPont Somos ™ 3100 Resin Modified with 20% Reactive PCL Toughener

| | Impact Toughness (J/m) | n | Std. Dev. | 95% Confidence Interval | |
|---|---|---|---|---|---|
| | | | | Upper | Lower |
| Control | 29.66 | 5 | 11.12 | 40.26 | 19.06 |
| 20% Low MW PCL | 130.80 | 7 | 56.94 | 172.62 | 88.98 |
| 20% High MW PCL | 339.04 | 7 | 88.51 | 404.04 | 274.04 |

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A toughener for use with a thermosetting resin capable of undergoing ring opening polymerization, comprising a crystalline polylactone having one or more carboxylic groups per chain, said functionalized polylactone having an average molecular weight of at least about 1000.

2. The toughener set forth in claim 1 wherein said functionalized polylactone has an average molecular weight of at least about 10,000.

3. The toughener set forth in claim 1 wherein said thermosetting resin comprises an epoxy resin.

4. The toughener set forth in claim 1 wherein malic acid is the precursor of the carboxylic group of said functionalized polylactone.

5. An internal plasticizer for use in a thermosetting resin composition, wherein said thermosetting resin includes reactive carboxylic groups, said plasticizer comprising a reactive polymer of the formula:

$$HO + (CH_2)_5 - COO \overline{)_{n-1}} (CH_2)_5 - COO - CRR_1 - COOH$$

where R and $R_1$ are independently hydrogen, methyl, or —$CHR_2$—COOH, and $R_2$ is hydrogen, methyl, or —$CH_2$—COOH and n is at least 5.

6. A plasticizer as set forth in claim 5 wherein the average value of n is from about 10 to about 1500.

7. A plasticizer as set forth in claim 6 where the average value of n is from about 20 to about 1000.

8. A plasticizer as set forth in claim 7 wherein the average value of n is from about 50 to about 200.

* * * * *